(12) United States Patent
Ishikawa et al.

(10) Patent No.: US 11,068,716 B2
(45) Date of Patent: Jul. 20, 2021

(54) INFORMATION PROCESSING METHOD AND INFORMATION PROCESSING SYSTEM

(71) Applicant: Panasonic Intellectual Property Management Co., Ltd., Osaka (JP)

(72) Inventors: Kazunobu Ishikawa, Osaka (JP); Takuya Yamaguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 27 days.

(21) Appl. No.: 16/526,309

(22) Filed: Jul. 30, 2019

(65) Prior Publication Data
US 2020/0042794 A1 Feb. 6, 2020

(30) Foreign Application Priority Data

Aug. 2, 2018 (JP) .............................. JP2018-146202
Apr. 1, 2019 (JP) .............................. JP2019-070210

(51) Int. Cl.
| | | |
|---|---|---|
| *G06K 9/00* | (2006.01) | |
| *G06T 7/73* | (2017.01) | |
| *G06T 7/50* | (2017.01) | |
| *G06F 40/169* | (2020.01) | |

(52) U.S. Cl.
CPC ........ *G06K 9/00671* (2013.01); *G06F 40/169* (2020.01); *G06K 9/00201* (2013.01); *G06T 7/50* (2017.01); *G06T 7/73* (2017.01)

(58) Field of Classification Search
CPC .... G06K 9/00671; G06K 9/6215; G06K 9/46; G06F 40/169; G06F 16/5854; G06F 16/5838; G06F 3/04842; G06T 7/73; G06T 7/50; G06T 7/60; G06T 7/70; G06N 3/08; G06N 5/00
See application file for complete search history.

(56) References Cited

U.S. PATENT DOCUMENTS

| | | | |
|---|---|---|---|
| 10,223,591 B1 * | 3/2019 | Goldenberg | H04N 5/91 |
| 2015/0254223 A1 * | 9/2015 | Sakaki et al. | G06F 17/241 |
| 2018/0336481 A1 * | 11/2018 | Guttmann | G06N 5/046 |
| 2018/0373943 A1 * | 12/2018 | Tanigawa et al. | G06K 9/00805 |

FOREIGN PATENT DOCUMENTS

JP 2015-200985 11/2015

* cited by examiner

*Primary Examiner* — Ping Y Hsieh
*Assistant Examiner* — Xiao Liu
(74) *Attorney, Agent, or Firm* — Wenderoth, Lind & Ponack, L.L.P.

(57) ABSTRACT

An information processing method includes, by using a computer: acquiring an annotation skill of an operator who provides annotation information to image; acquiring annotation-target image having an image feature identified based on the annotation skill; acquiring an annotation result attained by the operator for the annotation-target image; and updating the annotation skill using the annotation result and reference annotation information corresponding to the image feature.

11 Claims, 5 Drawing Sheets

INFORMATION PROCESSING METHOD AND INFORMATION PROCESSING SYSTEM

CROSS REFERENCE TO RELATED APPLICATIONS

This application claims the benefit of priority of Japanese Patent Application Number 2018-146202 filed on Aug. 2, 2018, and Japanese Patent Application Number 2019-070210 filed on Apr. 1, 2019, the entire contents of which are hereby incorporated by reference.

BACKGROUND

1. Technical Field

This disclosure relates to an information processing method and an information processing system.

2. Description of the Related Art

Attempts have recently been made to detect an object in an image using deep learning. Accurately detecting an object in an image requires, for example, collecting numerous images from which operators generate teaching data. Therefore, the accuracy of detecting an object in an image depends on the operators' skills.

Japanese Unexamined Patent Application Publication No. 2015-200985 (Patent Literature 1), for example, describes a technique regarding the operators' skills. In the task of marking a region containing a human face in an image (target content), a skill evaluation apparatus in Patent Literature 1 calculates the degree of similarity by comparing the position and area of the marked region with learning information. For a higher degree of similarity to the learning information, the skill evaluation apparatus considers the marking task as performed by a more highly skilled operator. This allows highly skilled operators to be selected among operators. The evaluation result is fed back to the operators.

SUMMARY

With the conventional technique disclosed in Patent Literature 1, it is difficult to efficiently improve the operators' skills according to their personal characteristics.

The present disclosure provides an information processing method and an information processing system that enable an operator's annotation skill to be efficiently improved according to the operator's personal characteristics.

In order to achieve the above-described object, in accordance with an aspect of the present disclosure, there is provided an information processing method including, by using a computer: acquiring an annotation skill of an operator who provides annotation information to sensing data; acquiring annotation-target sensing data having a sensing-data feature identified based on the annotation skill; acquiring an annotation result attained by the operator for the annotation-target sensing data; and updating the annotation skill using the annotation result and reference annotation information corresponding to the sensing-data feature.

The general and specific aspects according to the above-described embodiments may be implemented to a system, a method, an integrated circuit, a computer program, or a computer-readable recording medium such as a Compact Disc-Read Only Memory (CD-ROM), or may be any combination of them.

According to the aspects in this disclosure including the information processing method, an operator's annotation skill can be efficiently improved according to the operator's personal characteristics.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
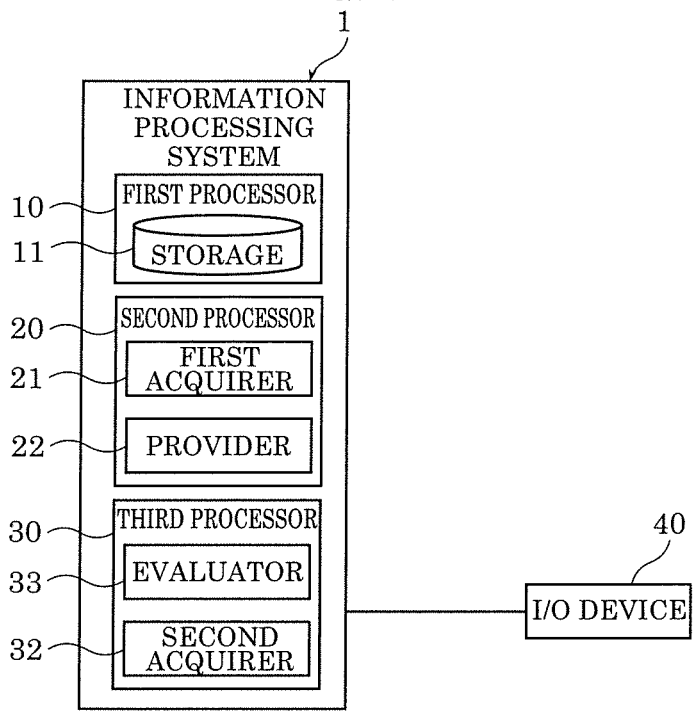
FIG. 1 is a block diagram illustrating an information processing system and an I/O device according to Embodiment 1.

In accordance with an aspect of the present disclosure, there is provided an information processing method including, by using a computer: acquiring an annotation skill of an operator who provides annotation information to sensing data; acquiring annotation-target sensing data having a sensing-data feature identified based on the annotation skill; acquiring an annotation result attained by the operator for the annotation-target sensing data; and updating the annotation skill using the annotation result and reference annotation information (correct annotation information) corresponding to the sensing-data feature.

As above, the annotation-target sensing data appropriate to the operator's annotation skill is determined, which enables annotation training according to the operator's personal characteristics. For example, sensing data in which the operator is weak is selected as the annotation-target sensing data. The annotation skill is automatically updated, so that the annotation skill can be constantly improved. Thus, the operator's annotation skill can be efficiently improved according to the operator's personal characteristics.

In accordance with another aspect of the present disclosure, there is provided an information processing system including: a first acquirer that acquires annotation-target sensing data having a sensing-data feature identified based on an annotation skill of an operator who provides annotation information to sensing data; a second acquirer that acquires an annotation result attained by the operator for the annotation-target sensing data; and a processor that updates the annotation skill using the annotation result and reference annotation information corresponding to the sensing-data feature.

This information processing system also achieves the above-described functional effects.

In the information processing method according to the aspect of the present disclosure, the annotation skill comprises a skill related to designation of the annotation information.

As above, the skill that directly relates to the quality of the annotation information is addressed. This can effectively improve the quality of a learning model learned using teaching data generated by annotation.

In the information processing method according to the aspect of the present disclosure, the designation of the annotation information comprises designation of at least one of a position, size, and shape of an annotation.

As above, the operator can take training for designating at least one of the position, size, and shape of the annotation. Thus, taking training for annotation designation in which the operator is weak improves the accuracy of the task of providing the annotation information to the annotation-target sensing data.

In the information processing method according to the aspect of the present disclosure, the designation of the annotation information comprises designation of a label of an annotation.

As above, the operator can take training for annotation designation on an annotation label (e.g., class) basis. Thus, taking training for an annotation class in which the operator is weak improves the accuracy of the task of providing the annotation information to the annotation-target sensing data.

In the information processing method according to the aspect of the present disclosure, the annotation result comprises time spent on designating the annotation information, and the annotation skill comprises time required to designate the annotation information.

This allows the operator to take training for improving the time required for the annotation designation task. Thus, the operator can improve the skill of quickly providing the annotation information to the annotation-target sensing data.

In the information processing method according to the aspect of the present disclosure, the sensing data is image data, and the annotation-target sensing data is annotation-target image data.

This allows the annotation skill to be efficiently improved for image data, which typically includes a large amount of information and therefore may cause variations in individual operators' improvements in annotation skills.

The information processing method according to the aspect of the present disclosure further includes: identifying the reference annotation information based on the annotation skill; and acquiring the annotation-target image data by selecting, from a plurality of sets of the annotation-target image data, annotation-target image data containing an object corresponding to the reference annotation information identified.

This allows annotation-target image data with teaching data to be selected, which leads to the improvement of the annotation skill. For example, annotation-target image data expected to be given annotation information in which operator is weak is selected. The operator can thus take training for a task in which the operator is weak.

The information processing method according to the aspect of the present disclosure further includes: identifying the reference annotation information based on the annotation skill; and acquiring the annotation-target image data by generating image data containing an object corresponding to the reference annotation information identified.

This allows the operator to be given training without existing annotation-target image data suitable for improving the annotation skill.

In the information processing method according to the aspect of the present disclosure, generating the image data comprises synthesizing (i) image data containing an object corresponding to the reference annotation information identified and (ii) another image data.

This allows annotation-target image data with teaching data to be efficiently generated.

The information processing method according to the aspect of the present disclosure further includes: presenting a difference between the reference annotation information and the annotation result to the operator.

This allows the operator to intuitively recognize the operator's annotation skill from the difference between the reference annotation information and the annotation result.

The information processing method according to the aspect of the present disclosure further includes: presenting, to the operator, the annotation skill updated.

This allows the operator to know the state of the operator's annotation skill. For example, the operator can know whether the annotation skill has improved, remains unchanged, or has lowered. Thus, the operator can be directly or indirectly prompted to take actions for improving the annotation skill.

The general and specific aspects according to the above-described embodiments may be implemented to a system, a method, an integrated circuit, a computer program, or a computer-readable recording medium such as a Compact Disc-Read Only Memory (CD-ROM), or may be any combination of them.

Hereinafter, certain exemplary embodiments are described in greater detail with reference to the accompanying Drawings. It should be noted that all the embodiments described below are generic and specific examples of the present disclosure. Numerical values, shapes, materials, constituent elements, arrangement positions and the connection configuration of the constituent elements, steps, the order of the steps, and the like described in the following embodiments are merely examples, and are not intended to limit the present disclosure. The present disclosure is characterized by the appended claims. Therefore, among the constituent elements in the following embodiments, constituent elements that are not described in independent claims that show the most generic concept of the present disclosure are described as elements constituting more desirable configurations.

Furthermore, each figure in the Drawings is a schematic diagram and is not necessarily an exact diagram. In each figure, substantially identical constituent elements are assigned with a same reference sign, and explanation of such substantially identical constituent elements is sometimes not repeated or simplified.

The information processing methods and information processing systems according to the embodiments in this disclosure will be described below.

Embodiment 1

[Configuration]

Figure 2:
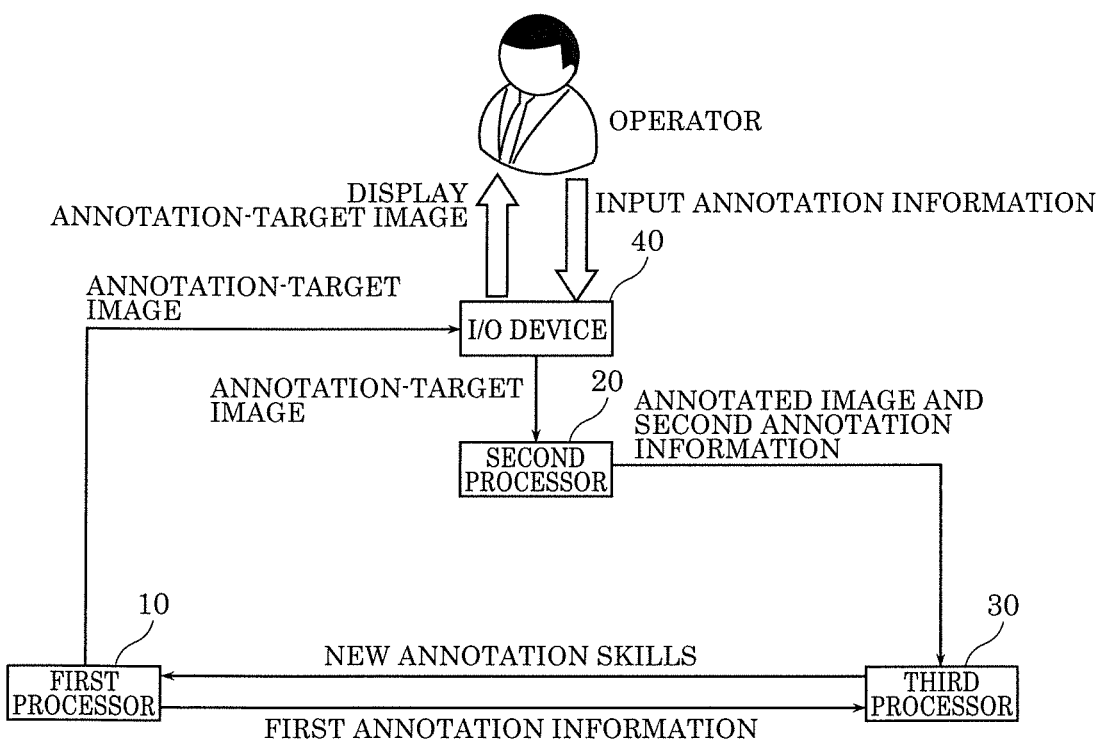
FIG. 2 is a diagram illustrating information transfer in the information processing system according to Embodiment 1.

FIG. 1 is a block diagram illustrating information processing system 1 and I/O device 40 according to Embodiment 1. FIG. 2 is a diagram illustrating information transfer in information processing system 1 according to Embodiment 1.

As shown in FIGS. 1 and 2, an operator (also called an annotator) annotates sensing data for machine learning. For example, the sensing data is image data. To an image captured by an imaging apparatus or an image synthesized with computer graphics (CG) (hereinafter referred to as an annotation-target image), the operator provides annotation information about an object seen in the annotation-target image. Information processing system 1 evaluates the accuracy of the annotation information provided to the annotation-target image. Information processing system 1 evaluates the operator (determines the operator's annotation skills) based on the annotation-target image having the annotation information provided by the operator, and causes the operator to perform the task of providing annotation information to annotation-target images according to the evaluation. The object may be anything, for example a person, an animal, a vehicle, or a facility.

Annotation herein refers to providing, as an annotation (a label) in text form, relevant metadata to a specific object associated with an annotation-target image. An annotation-target image is an image in which an object to be targeted by the operator is seen and in which the operator is supposed to provide annotation information to the object.

I/O device 40 used by the operator to provide annotation information is connected to information processing system 1. For example, I/O device 40 is a personal computer that receives operator's input via a screen, such as a browser displayed on the personal computer. Information processing system 1 includes first processor 10, second processor 20, and third processor 30.

First processor 10 has storage 11 that stores information indicating annotation-target images, first annotation information, and information indicating operators' annotation skills. The first annotation information referred to herein is annotation information (also referred to as reference data) serving as a standard for evaluating whether annotation information provided to an annotation-target image annotated by the operator (i.e., an annotated image) is correct. The first annotation information is an example of reference annotation information.

If storage 11 does not have an annotation-target image containing an object appropriate to the annotation skills, first processor 10 generates an annotation-target image containing an object appropriate to the annotation skills. The generation of the annotation-target image includes synthesizing an image containing an object corresponding to identified second annotation information with another image.

Figure 3A:
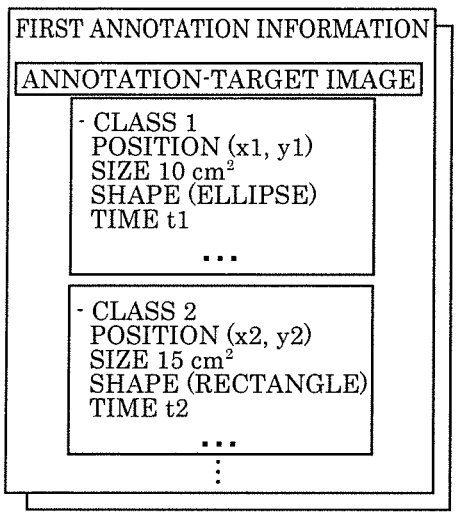
FIG. 3A is a diagram illustrating first annotation information according to Embodiment 1.

An example of the first annotation information will be described with reference to FIG. 3A. FIG. 3A is a diagram illustrating the first annotation information according to Embodiment 1.

As shown in FIG. 3A, the first annotation information is text data serving as the standard, including the position in x and y coordinates, size, and shape of an object (corresponding to CLASS in FIG. 3A) seen in each annotation-target image, and the time to be required to provide the annotation information. If the annotation-target image contains multiple objects, the first annotation information includes text data sets for the respective objects.

Figure 3B:
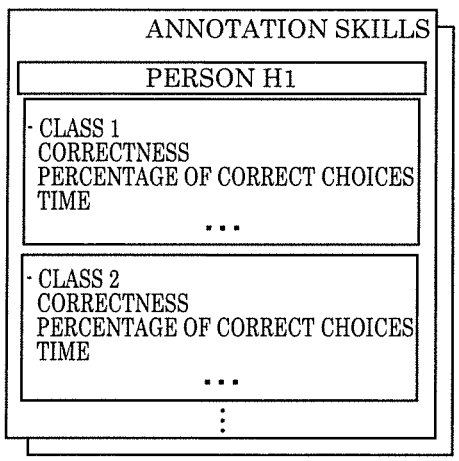
FIG. 3B is a diagram illustrating annotation skills according to Embodiment 1.

An example of the information indicating the annotation skills will be described with reference to FIG. 3B. FIG. 3B is a diagram illustrating the annotation skills according to Embodiment 1.

As shown in FIG. 3B, an annotation skill is a skill related to designating (providing) annotation information. That is, an annotation skill is the operator's skill that indicates items related to the operator's task of providing annotation information to an annotation-target image, such as the correctness for each object, the percentage of correct choices, and the processing time required to provide the annotation information. For example, the annotation skill is an index that evaluates the accuracy of the operator's task of providing the annotation information to the annotation-target image. The annotation skill is determined for each object. The correctness means the accuracy of the annotation information, such as the position, range (size), and shape designated in the annotation information provided to the object in the annotation-target image.

First processor 10 acquires the annotation skills of the operator who is to provide annotation information. First processor 10 outputs, to I/O device 40, an annotation-target image having an image feature identified based on the operator's annotation skills. The image feature is, for example, an object seen in the image. Upon receiving the annotation-target image, I/O device 40 displays the annotation-target image in order for the operator to perform the task of providing annotation information.

First processor 10 also updates the operator's annotation skills in response to receiving information indicating the operator's annotation skills evaluated by evaluator 33 (to be described below). Alternatively, first processor 10 may acquire, from some other apparatus, the information indicating the operator's annotation skills evaluated by the other apparatus.

Second processor 20 has first acquirer 21 and provider 22.

First acquirer 21 acquires, via I/O device 40, input of the annotation information provided by the operator to the annotation-target image.

Provider 22 receives, from first acquirer 21, the input of the annotation information provided to the annotation-target image. According to the input, provider 22 generates an annotated image having the annotation information provided, and second annotation information to be described below. The second annotation information is annotation information provided by the operator to the annotation-target image, and it is text data corresponding to the annotated image. The second annotation information includes the time spent on designating (providing) the annotation information. Provider 22 outputs, to third processor 30, information indicating the annotated image and the second annotation information generated. The second annotation information is an example of an annotation result.

Figure 3C:
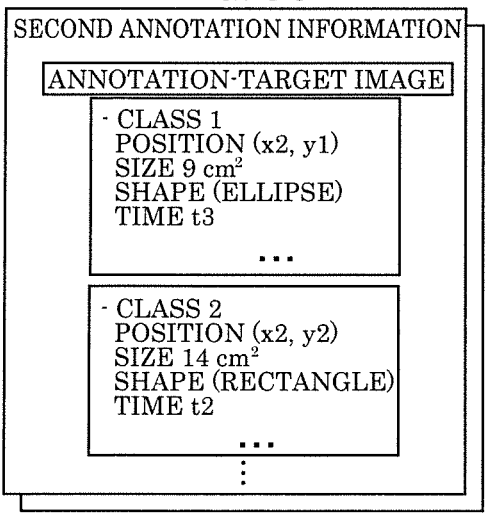
FIG. 3C is a diagram illustrating second annotation information according to Embodiment 1.

The second annotation information will be described with reference to FIG. 3C. FIG. 3C is a diagram illustrating the second annotation information according to Embodiment 1.

As shown in FIG. 3C, the second annotation information is text data indicating items input by the operator for each annotation-target image, such as the position in x and y coordinates, size, and shape of the object, and the time required to provide the annotation information. If the annotation-target image contains multiple objects, the second annotation information includes text data sets for the respective objects.

Third processor 30 has second acquirer 32 and evaluator 33.

Second acquirer 32 acquires the annotated image and the second annotation information from second processor 20 and outputs the second annotation information to evaluator 33. Second acquirer 32 also acquires, from storage 11 of first processor 10, the first annotation information to be compared with the second annotation information, and outputs the acquired first annotation information to evaluator 33.

Evaluator 33 evaluates the second annotation information. Specifically, evaluator 33 compares the items such as the position, size, and shape of each object in the second annotation information in FIG. 3C with the items such as the position, size, and shape of each object in the first annotation information in FIG. 3A, and calculates a difference (a degree of similarity) for each object. On the basis of the calculated difference, evaluator 33 generates information indicating the operator's annotation skills. Evaluator 33 outputs the generated information indicating the new annotation skills to first processor 10. The information indicating the operator's annotation skills stored in storage 11 of first processor 10 is automatically updated.

If the difference (the degree of similarity) calculated by evaluator 33 is equal to or above a predetermined threshold, the annotated image can be regarded as an accurate annotated image. In this case, the annotated image and the second annotation information may be sent as a finished article to an external apparatus.

[Operations]

Operations in information processing system 1 in this embodiment will be described with reference to FIG. 4.

Figure 4:
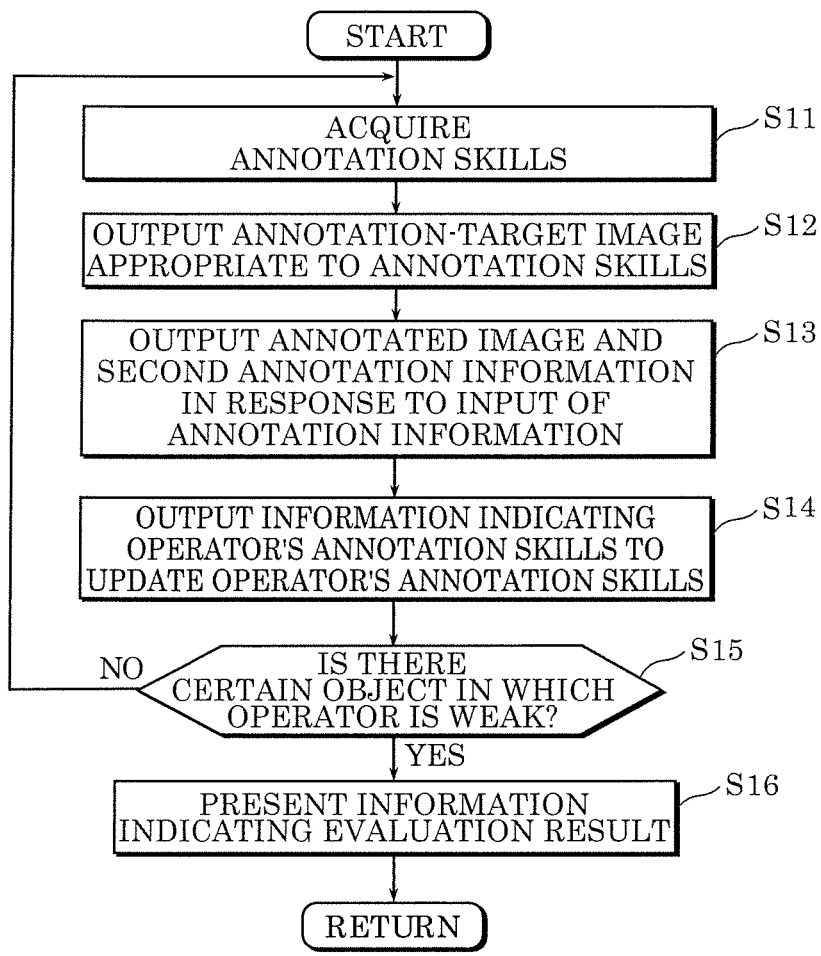
FIG. 4 is a diagram illustrating operations in the information processing system according to Embodiment 1.

FIG. 4 is a diagram illustrating operations in information processing system 1 according to Embodiment 1.

In this information processing system 1, the operators' annotation skills are assumed to be stored in storage 11 of first processor 10 in advance. The operator performs the task of providing annotation information to an annotation-target image via I/O device 40.

As shown in FIG. 4, firstly, first processor 10 acquires the operator's annotation skills from storage 11 (S11).

First processor 10 then outputs an annotation-target image having an image feature identified based on the acquired annotation skills (S12). Specifically, first processor 10 searches storage 11 for an annotation-target image containing an object appropriate to the annotation skills. If an annotation-target image containing an object appropriate to the annotation skills exists, first processor 10 selects this annotation-target image. If an annotation-target image containing an object appropriate to the annotation skills does not exist in storage 11, first processor 10 generates an annotation-target image containing an object appropriate to the annotation skills. First processor 10 outputs the selected or generated annotation-target image to I/O device 40.

Figure 5:
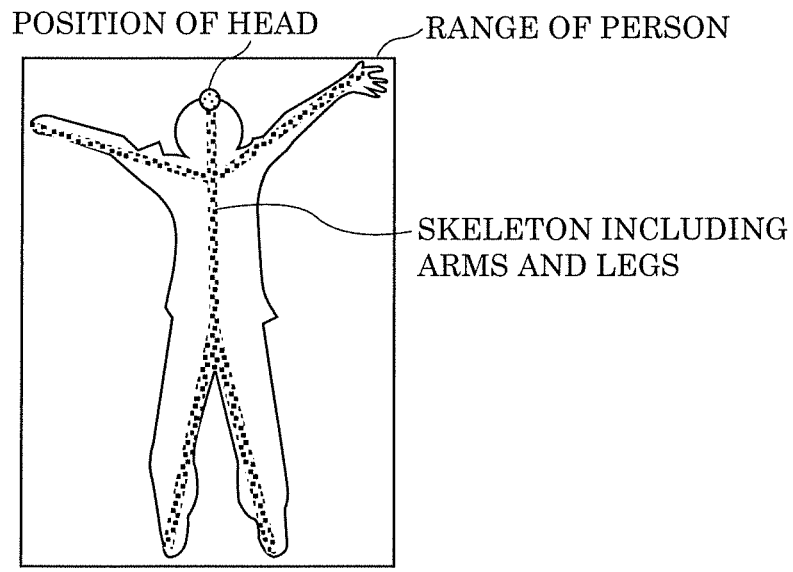
FIG. 5 is a diagram illustrating the task of providing annotation information to an annotation-target image.

The operator then inputs annotation information for the annotation-target image displayed on I/O device 40. Here, an example of the task of providing the annotation information to the annotation-target image will be described with reference to FIG. 5. FIG. 5 is a diagram illustrating the task of providing the annotation information to the annotation-target image.

For example, I/O device 40 displays the items each having a contrasting and mutually independent pair of choices:
(1) "the arms are raised" or "the arms are lowered," and
(2) "the legs are spread" or "the legs are closed."

The operator performs the task by selecting either of the choices of each item.

The operator also sets the range of the object (the person in FIG. 5) seen in the annotation-target image via I/O device 40 in order to provide annotation information about the position of the person in the annotation-target image. The operator also sets the position of the person's head as a point, and sets the person's skeleton including the arms and legs as lines.

As shown in FIG. 4, I/O device 40 receives the input from the operator, which is then output to second processor 20. First acquirer 21 of second processor 20 receives the operator's input of providing the annotation information to the annotation-target image. Provider 22 of second processor 20 provides the annotation information to the annotation-target image to generate an annotated image and the second annotation information. Second processor 20 outputs the annotated image and the second annotation information to third processor 30 (S13).

Second acquirer 32 of third processor 30 then acquires the second annotation information from second processor 20 and the first annotation information from storage 11 of first processor 10, which are both output to evaluator 33. Evaluator 33 compares the items such as the position, size, and shape of each object in the second annotation information in FIG. 3C with the items such as the position, size, and shape of each object in the first annotation information in FIG. 3A, and calculates the difference (the degree of similarity) for each object. The difference is calculated for each object in the second annotation information. On the basis of the calculated difference, evaluator 33 generates information indicating the operator's annotation skills. Evaluator 33 outputs the information indicating the operator's annotation skills to first processor 10, so that the information indicating the operator's annotation skills stored in storage 11 of first processor 10 is updated (S14).

Evaluator 33 determines whether there is a certain object (operation) in which the operator is weak in performing the task of providing the annotation information to the annotation-target image (S15). Specifically, evaluator 33 determines whether any annotation skill in the information indicating the operator's annotation skills is below a predetermined threshold.

If no annotation skill is below the predetermined threshold (No at S15), there is no operation in which the operator is weak. Therefore, information processing system 1 returns the flow to step S11.

If any annotation skill is below the predetermined threshold (YES at S15), there is an operation in which the operator is weak. Therefore, evaluator 33 generates information indicating the evaluation result representing the annotation skill below the predetermined threshold and presents the information indicating the evaluation result to the operator (S16). That is, evaluator 33 outputs the information indicating the evaluation result to I/O device 40 or to an external display device such as of a personal computer.

Here, the evaluation result presented to the operator will be illustrated.

Third processor 30 presents the standard annotated image and standard choices, as well as the annotated image annotated by the operator and the choices selected by the operator. Third processor 30 also presents the differences (disagreements) between the annotations made by the operator and the standard annotations. The differences are represented as a statistical index that collectively evaluates the objects in the annotation-target image, individual indexes that evaluate the respective objects, an absolute index that evaluates in terms of the achievement of the objective, and relative indexes that evaluate in terms of relations among the objects. On the basis of the above indexes, third processor 30 presents an operation in which the operator is strong, or an operation in which the operator is weak.

Third processor 30 may also present the time required to annotate each object in the annotation-target image, comparison of the annotation skills between the operator and the other operators, the operator's historical annotation skills, the ranking of the operators, the operator's piece rate, and exercises for the operator.

Information processing system 1 then terminates the process and returns the flow to the initial step.

[Advantageous Effects]

Thus, in this information processing system 1, an annotation-target image containing an image feature appropriate to the operator's annotation skills is determined. This enables annotation training according to the operator's personal characteristics. For example, an image in which the operator is weak is determined as the annotation-target image.

Evaluator 33 causes the operator's annotation skills stored in storage 11 of first processor 10 to be updated. Therefore, annotation-target images containing image features appropriate to the operator's new (updated) annotation skills can be determined. The operator can take training for providing annotation information to the annotation-target images appropriate to the operator's annotation skills to constantly improve the annotation skills. Thus, the operator's annotation skills can be efficiently improved according to the operator's personal characteristics.

Embodiment 2

[Configuration]

The information processing method and information processing system 200 in Embodiment 2 are configured as in Embodiment 1 unless otherwise specified. Like components are given like reference symbols and will not be described in detail.

Figure 6:
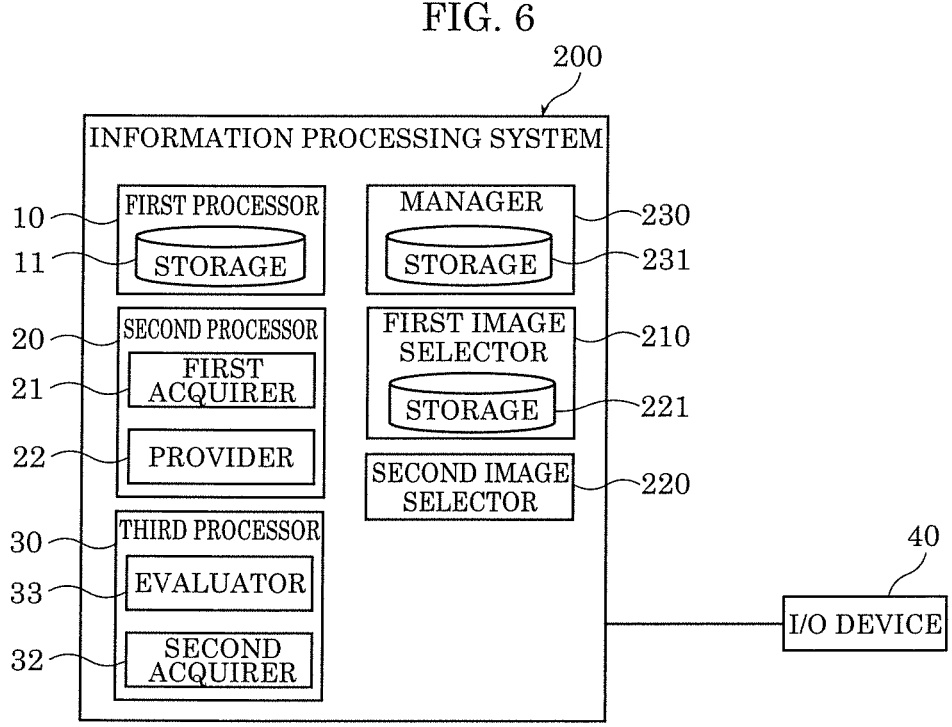
FIG. 6 is a block diagram illustrating an information processing system and an I/O device according to Embodiment 2.
Figure 7:
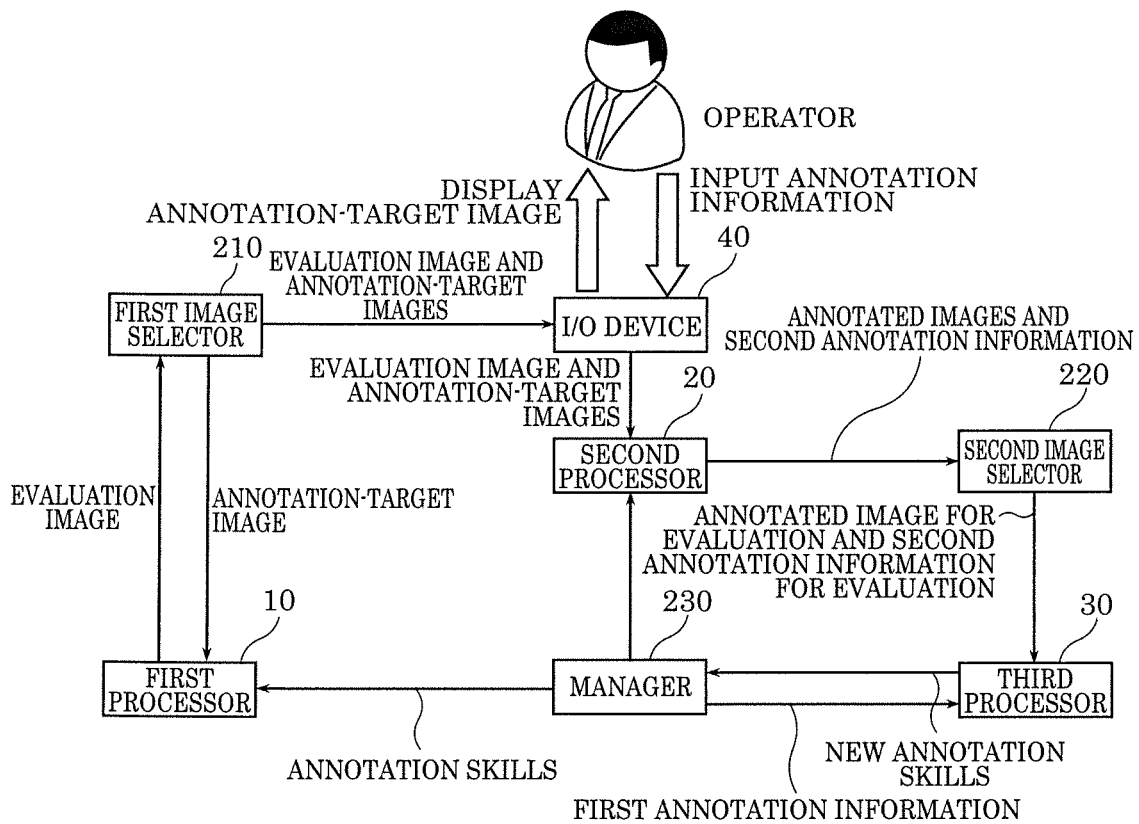
FIG. 7 is a diagram illustrating information transfer in the information processing system according to Embodiment 2.

FIG. 6 is a block diagram illustrating information processing system 200 and I/O device 40 according to Embodiment 2. FIG. 7 is a diagram illustrating information transfer in information processing system 200 according to Embodiment 2.

As shown in FIGS. 6 and 7, in information processing system 200 in this embodiment, an evaluation image for evaluating the operator's annotation skills is mixed with annotation-target images to be presented to the operator. Information processing system 200 mixes the evaluation image with the annotation-target images in such a manner that the evaluation image appears equivalent to the annotation-target images; this prevents the operator from noticing the presence of the evaluation image for evaluating the operator's annotation skills while performing the annotation task. Information processing system 200 can thus present the annotation-target images and the evaluation image to the operator.

In addition to first processor 10, second processor 20, and third processor 30, information processing system 200 includes first image selector 210, second image selector 220, and manager 230.

First processor 10 has storage 11 that stores information indicating evaluation images and the first annotation information. Upon acquiring information indicating the operator's annotation skills from manager 230, first processor 10 acquires an evaluation image appropriate to the annotation skills. For example, first processor 10 processes an evaluation image to be presented to the operator so that the evaluation image appears equivalent to the annotation-target images to be presented by first image selector 210 to the operator (so that the operator does not notice that the image is an evaluation image and not an annotation-target image). If an appropriate evaluation image does not exist in storage 11, first processor 10 generates a new evaluation image to be presented to the operator, or processes an annotation-target image into an evaluation image. In this manner, first processor 10 acquires the evaluation image.

First image selector 210 holds annotation-target images to which annotation information is to be provided by the operators. First image selector 210 has storage 221 that stores the annotation-target images. First image selector 210 acquires the operator's annotation skills from manager 230 and determines annotation-target images appropriate to the annotation skills. First image selector 210 acquires the evaluation image from first processor 10, mixes the acquired evaluation image with the annotation-target images, and outputs the evaluation image and the annotation-target images to I/O device 40.

Second image selector 220 acquires information indicating annotated images and the second annotation information, which are generated by second processor 20 via I/O device 40. Out of the information indicating the annotated images and the second annotation information, second image selector 220 outputs, to third processor 30, information indicating the annotated image for evaluation (the annotated evaluation image) and the second annotation information for evaluation.

Evaluator 33 of third processor 30 evaluates the second annotation information for evaluation with respect to the first annotation information. Evaluator 33 generates information indicating the operator's annotation skills and outputs this information to manager 230.

It is to be noted that second image selector 220 may send, as finished articles, information indicating the annotated images not for evaluation and the second annotation information not for evaluation to an external apparatus.

Manager 230 includes storage 231 storing information indicating annotation skills, and manages the operators' annotation skills. In response to receiving the operator's annotation skills, manager 230 updates the operator's annotation skills stored in storage 231.

Manager 230 may select operators based on the annotation skills. For example, manager 230 may select an operator having generally low annotation skills and intensively assign this operator the task of providing annotation information to annotation-target images.

[Operations]

Operations in information processing system 200 in this embodiment will now be described.

Figure 8:
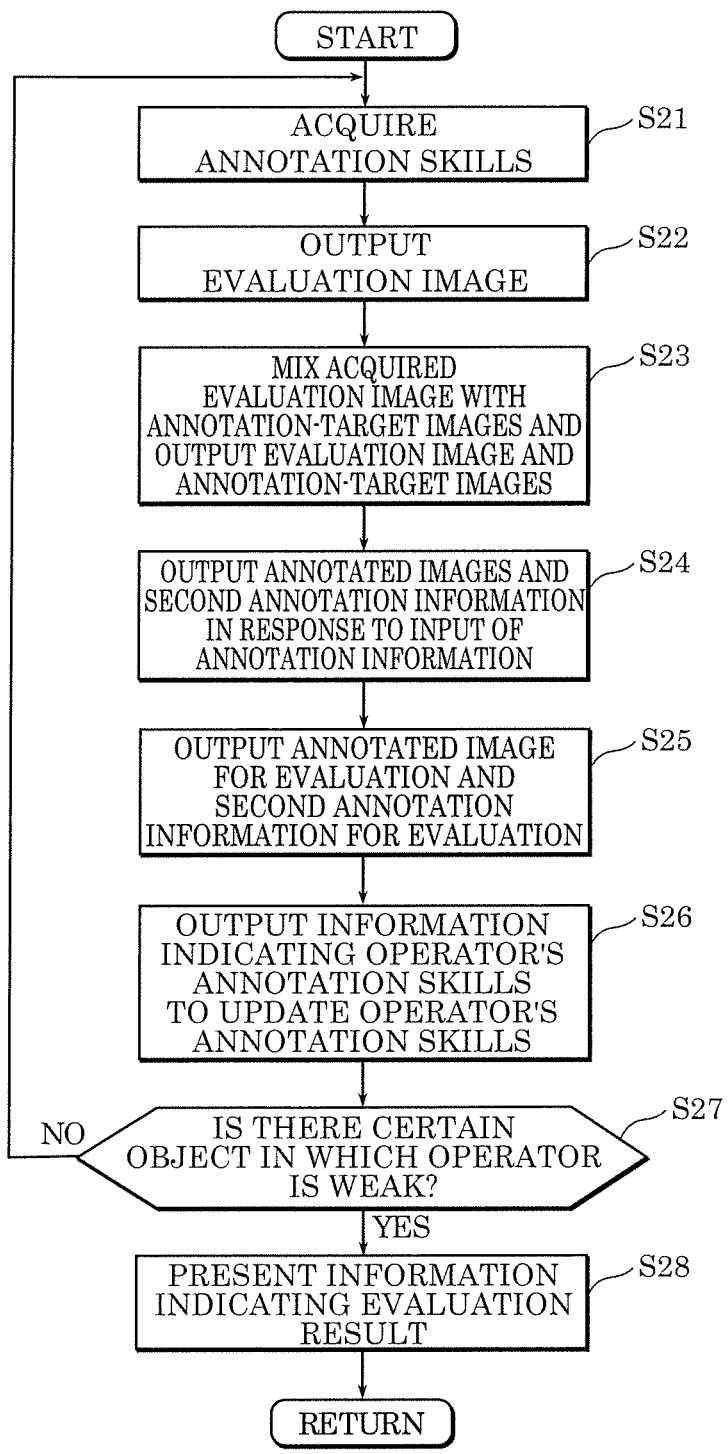
FIG. 8 is a diagram illustrating operations in the information processing system according to Embodiment 2.

FIG. 8 is a diagram illustrating operations in information processing system 200 according to Embodiment 2.

In this information processing system 200, the operators' annotation skills are assumed to be stored in manager 230 in advance.

As shown in FIG. 8, firstly, first processor 10 acquires the operator's annotation skills from manager 230 (S21).

First processor 10 then outputs an evaluation image appropriate to the acquired annotation skills (S22). Specifically, first processor 10 searches storage 11 for an evaluation image containing an object appropriate to the annotation skills. If an evaluation image containing an object appropriate to the annotation skills exists, first processor 10 selects this evaluation image. If an evaluation image containing an object appropriate to the annotation skills does not exist in storage 11, first processor 10 may generate an evaluation image containing an object appropriate to the annotation skills. Alternatively, first processor 10 may acquire, from first image selector 210, an annotation-target image to be presented to the operator and process this image into an evaluation image such that the operator does not notice that the image is an evaluation image. First processor 10 outputs information indicating the selected, generated, or processed evaluation image to first image selector 210.

First image selector 210 acquires the operator's annotation skills from manager 230 via first processor 10 and selects annotation-target images appropriate to the annotation skills. First image selector 210 acquires the evaluation image from first processor 10, mixes the acquired evaluation image with the annotation-target images, and outputs the evaluation image and the annotation-target images to I/O device 40 (S23).

I/O device 40 receives input from the operator, which is then output to second processor 20. Second processor 20 generates annotated images and the second annotation information as a result of the operator providing annotation information to the annotation-target images. Second processor 20 outputs the annotated images and the second annotation information to second image selector 220 (S24).

Second image selector 220 acquires information indicating the annotated images and the second annotation information. Out of the information indicating the annotated images and the second annotation information, second image selector 220 outputs, to third processor 30, information indicating the annotated image for evaluation (the annotated evaluation image) and the second annotation information for evaluation (S25).

Third processor 30 receives the information indicating the annotated image for evaluation, and the second annotation information for evaluation. Evaluator 33 of third processor 30 evaluates the second annotation information for evaluation with respect to the first annotation information. That is, evaluator 33 generates information indicating the operator's annotation skills based on the difference between the second annotation information for evaluation and the first annotation information for evaluation. Evaluator 33 outputs the information indicating the operator's annotation skills to first processor 10, so that the information indicating the operator's annotation skills stored in storage 11 of first processor 10 is updated (S26). Thus, evaluator 33 determines whether there is a certain object (operation) in which the operator is weak in performing the task of providing the annotation information to the annotation-target image (S27). Specifically, evaluator 33 determines whether any annotation skill in the information indicating the operator's annotation skills is below a predetermined threshold.

If no annotation skill is below the predetermined threshold (NO at S27), there is no operation in which the operator is weak. Therefore, information processing system 200 returns the flow to step S21.

If any annotation skill is below the predetermined threshold (YES at S27), there is an operation in which the operator is weak. Therefore, evaluator 33 generates information indicating the evaluation result representing the annotation skill below the predetermined threshold and presents the information indicating the evaluation result to the operator (S28).

Evaluator 33 outputs the information indicating the annotation skills to manager 230. Manager 230, in response to receiving the information indicating the operator's annotation skills, updates the operator's annotation skills stored in storage 231. Information processing system 200 then terminates the process and returns the flow to the initial step.

[Advantageous Effects]

Thus, in this information processing system 200, an evaluation image is processed or selected in such a manner that the image is not identified as an evaluation image distinct from annotation-target images. Information processing system 200 mixes the evaluation image with the annotation-target images and presents these images to the operator. Because the operator is unlikely to notice the presence of the evaluation image, the evaluation of the operator's annotation skills can be facilitated.

Other functional effects achieved in this embodiment are the same as those achieved in Embodiment 1.

Variations

While the information processing methods and the information processing systems according to Embodiments 1 and 2 in this disclosure have been described above, embodiments in this disclosure are not limited to the above-described Embodiments 1 and 2.

For example, while the sensing data to be annotated is image data in the examples in the above-described embodiments, the sensing data is not limited to image data. The sensing data to be annotated may be other types of sensing data, such as distance data obtained from a distance sensor, sound data obtained from a microphone, point-group data obtained from a radar such as a light detection and ranging (LIDAR), and odor data obtained from an odor sensor.

Furthermore, for example, the information processing method according to the above-described embodiment may be implemented as a program executed by a computer or a recording medium storing the program.

It should be noted that the processing units included in the information processing system according to the above-described embodiment are typically implemented into a Large Scale Integration (LSI) which is an integrated circuit. These may be integrated separately, or a part or all of them may be integrated into a single chip.

The technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

It should be noted that, in the above-described embodiments, each of the constituent elements may be implemented into a dedicated hardware or implemented by executing a software program suitable for the constituent element. Each of the constituent elements may be implemented when a program executing unit, such a central processing unit (CPU) or a processor, reads a software program from a recording medium, such as a hard disk or a semiconductor memory, and executes the readout software program.

Furthermore, all the numerical values indicated in the above are examples for explaining the present disclosure in detail, and do not limit the present disclosure.

The dividing of the functional blocks in each of the block diagrams is one example. It is possible that a plurality of functional blocks are implemented into a single functional block, that a single functional block is divided into a plurality of functional blocks, and that a function executed by a functional block is partially executed by another functional block. Furthermore, similar functions of a plurality of functional blocks may be executed by a single hardware or software in parallel or by time division.

An order of performing the steps in each of the flowcharts is an example for explaining the present disclosure in detail. The steps may be performed in different orders. Different steps among the steps may be performed simultaneously, in other words, in parallel.

Although the information processing method and the information processing system according to the aspects of the present disclosure have been described based on Embodiments 1 and 2, the present disclosure is not limited to the embodiments. Those skilled in the art will be readily appreciate that various modifications and combinations of the constituent elements and functions in Embodiments 1 and 2 are possible without materially departing from the novel teachings and advantages of the present disclosure.

INDUSTRIAL APPLICABILITY

This disclosure is applicable to systems such as an evaluation system for knowing the skill of providing annotation information to sensing data, and a training system for improving the skill of providing annotation information to sensing data.

What is claimed is:

1. An information processing method comprising, by using a computer:
    acquiring an annotation skill of an operator who provides annotation information to image data;
    acquiring annotation-target image data containing an object appropriate to the annotation skill when the annotation skill is below a predetermined threshold;
    acquiring an annotation result attained by the operator for the annotation-target image data; and
    updating the annotation skill using the annotation result and reference annotation information corresponding to the object.

2. The information processing method according to claim 1, wherein the annotation skill comprises a skill related to designation of the annotation information.

3. The information processing method according to claim 2, wherein the designation of the annotation information comprises designation of at least one of a position, size, and shape of an annotation.

4. The information processing method according to claim 2, wherein the designation of the annotation information comprises designation of a label of an annotation.

5. The information processing method according to claim 1, wherein the annotation result comprises time spent on designating the annotation information, and the annotation skill comprises time required to designate the annotation information.

6. The information processing method according to claim 1, further comprising:
    identifying the reference annotation information based on the annotation skill; and
    acquiring the annotation-target image data by selecting, from a plurality of sets of the annotation-target image data, annotation-target image data containing an object corresponding to the reference annotation information identified.

7. The information processing method according to claim 1, further comprising:
    identifying the reference annotation information based on the annotation skill; and
    acquiring the annotation-target image data by generating image data containing an object corresponding to the reference annotation information identified.

8. The information processing method according to claim 7, wherein generating the image data comprises synthesizing (i) first image data containing an object corresponding to the reference annotation information identified and (ii) second image data that is different from the first image data.

9. The information processing method according to claim 1, further comprising:
    presenting a difference between the reference annotation information and the annotation result to the operator.

10. The information processing method according to claim 1, further comprising:
    presenting, to the operator, the annotation skill updated.

11. An information processing system comprising:
    a first acquirer that acquires annotation-target image data containing an object appropriate to an annotation skill of an operator who provides annotation information to image data when the annotation skill is below a predetermined threshold;
    a second acquirer that acquires an annotation result attained by the operator for the annotation-target image data; and
    a processor that updates the annotation skill using the annotation result and reference annotation information corresponding to the object.

* * * * *